United States Patent
Fukaya

(10) Patent No.: US 10,921,556 B2
(45) Date of Patent: Feb. 16, 2021

(54) IMAGING LENS

(71) Applicant: KANTATSU CO., LTD., Yaita (JP)

(72) Inventor: Hisao Fukaya, Sukagawa (JP)

(73) Assignee: KANTATSU CO., LTD., Tochigi (JP)

( * ) Notice: Subject to any disclaimer, the term of this patent is extended or adjusted under 35 U.S.C. 154(b) by 31 days.

(21) Appl. No.: 16/202,906

(22) Filed: Nov. 28, 2018

(65) Prior Publication Data

US 2019/0331878 A1    Oct. 31, 2019

(30) Foreign Application Priority Data

Nov. 28, 2017 (JP) ................. 2017-228116

(51) Int. Cl.
*G02B 9/62* (2006.01)
*G02B 13/00* (2006.01)

(52) U.S. Cl.
CPC ........... *G02B 9/62* (2013.01); *G02B 13/0045* (2013.01)

(58) Field of Classification Search
CPC ..... G02B 9/62; G02B 13/0045; G02B 13/002
USPC .................. 359/752, 756, 757, 713
See application file for complete search history.

(56) References Cited

U.S. PATENT DOCUMENTS

| 2014/0320980 A1* | 10/2014 | Chen .................. G02B 13/0045 359/713 |
| 2016/0170182 A1 | 6/2016 | Tanaka |
| 2017/0322392 A1* | 11/2017 | Katsuragi ................ G02B 9/62 |
| 2018/0059377 A1 | 3/2018 | Fukaya et al. |
| 2018/0188496 A1 | 7/2018 | Hsieh et al. |
| 2018/0259746 A1 | 9/2018 | Fukaya et al. |
| 2019/0056565 A1 | 2/2019 | Yang |

FOREIGN PATENT DOCUMENTS

JP    2016-114803 A    6/2016

* cited by examiner

*Primary Examiner* — Marin Pichler
(74) *Attorney, Agent, or Firm* — Hamre, Schumann, Mueller & Larson, P.C.

(57) ABSTRACT

There is provided an imaging lens with high-resolution which satisfies demand of the wide field of view, the low-profileness and the low F-number, and excellently corrects aberrations. An imaging lens comprises in order from an object side to an image side, a first lens having positive refractive power and a convex surface facing the object side near the optical axis, a second lens having negative refractive power near the optical axis, a third lens, a fourth lens, a fifth lens and a sixth lens having negative refractive power and a concave surface facing the image side near the optical axis, wherein the image-side surface of said sixth lens is formed as an aspheric surface having at least one off-axial pole point, the image-side surface of said first lens has the concave surface facing the image side near the optical axis, the image-side surface of said third lens has the concave surface facing the image side near the optical axis, said fifth lens has a biconvex shape having the convex surfaces facing the object side and the image side near the optical axis, the object-side surface of the sixth lens has the convex surface facing the object side near the optical axis, and predetermined conditional expressions are satisfied.

18 Claims, 8 Drawing Sheets

IMAGING LENS

The present application is based on and claims priority of a Japanese patent application No. 2017-228116 filed on Nov. 28, 2017, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device, and more particularly relates to an imaging lens which is built in an increasingly compact and high-performance smartphone and mobile phone, an information terminal such as a PDA (Personal Digital Assistant), a game console, PC and a robot, and moreover, a home appliance with camera function, a monitoring camera and an automobile.

Description of the Related Art

In recent years, it becomes common that camera function is mounted in a home appliance, information terminal equipment, an automobile and public transportation. Demand of products with the camera function is more increased, and development of products is being made accordingly.

The imaging lens mounted in such equipment is required to be compact and have high-resolution performance.

As a conventional imaging lens aiming high performance, for example, the imaging lens disclosed in Patent Document 1 (JP2016-114803A) has been known.

Patent Document 1 discloses an imaging lens comprising, in order from an object side, a first lens having positive refractive power and a convex surface facing the object side, a second lens having negative refractive power, a third lens having the convex surface facing the object side, a fourth lens having the positive refractive power, a fifth lens having the negative refractive power, and a sixth lens having the negative refractive power.

SUMMARY OF THE INVENTION

However, in lens configurations disclosed in the Patent Document 1, when wide field of view, low-profileness and low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the wide field of view, the low-profileness and the low F-number in well balance and excellently corrects aberrations.

Regarding terms used in the present invention, "a convex surface", "a concave surface" or "a plane surface" of lens surfaces implies that a shape of the lens surface near an optical axis (paraxial portion). "Refractive power" implies the refractive power near the optical axis. "A pole point" implies an off-axial point on an aspheric surface at which a tangential plane intersects the optical axis perpendicularly. "Total track length" is defined as a distance along the optical axis from an object-side surface of an optical element located closest to the object to an image plane. The total track length and a back focus is a distance obtained when thickness of an IR cut filter or a cover glass which may be arranged between the imaging lens and the image plane is converted into an air-converted distance.

An imaging lens according to the present invention comprises, in order from an object side to an image side, a first lens having positive refractive power and a convex surface facing the object side near the optical axis, a second lens having negative refractive power near the optical axis, a third lens, a fourth lens, a fifth lens and a sixth lens having the negative refractive power and a concave surface facing the image side near the optical axis, wherein the image-side surface of the sixth lens is formed as an aspheric surface having at least one off-axial pole point.

The imaging lens having the above-described configuration achieves wide field of view and low-profileness by strengthening the refractive power of the first lens. The second lens properly corrects spherical aberration and chromatic aberration occurring at the first lens. The third lens properly corrects coma aberration, astigmatism and distortion. The fourth lens properly corrects the spherical aberration, the coma aberration, the astigmatism and the distortion. The fifth lens properly corrects the astigmatism, field curvature and the distortion while maintaining the low-profileness. The sixth lens secures a back focus while maintaining the low-profileness. The image-side surface of the sixth lens has the concave surface facing the image side near the optical axis, and the field curvature and the distortion can be properly corrected and the light ray incident angle to an image sensor can be properly controlled, when the image-side surface of the sixth lens is formed as the aspheric surface having at least one off-axial pole point.

According to the imaging lens having the above-described configuration, it is preferable that the image-side surface of the first lens has the concave surface facing the image side near the optical axis.

When the image-side surface of the first lens has the concave surface facing the image side near the optical axis, proper corrections of the astigmatism and the distortion can be realized.

According to the imaging lens having the above-described configuration, it is preferable that the refractive power of the third lens is positive.

When the refractive power of the third lens is positive, it is advantageous for the low-profileness.

According to the imaging lens having the above-described configuration, it is preferable that the object-side surface of the third lens has the convex surface facing the object side near the optical axis.

When the object-side surface of the third lens has the convex surface facing the object side near the optical axis, the coma aberration and the astigmatism can be properly corrected.

According to the imaging lens having the above-described configuration, it is preferable that the image-side surface of the third lens has the concave surface facing the image side near the optical axis.

When the image-side surface of the third lens has the concave surface facing the image side near the optical axis, the field curvature and the distortion can be properly corrected.

According to the imaging lens having the above-described configuration, it is preferable that the image-side surface of the fourth lens has the concave surface facing the image side near the optical axis.

When the image-side surface of the fourth lens has the concave surface facing the image side near the optical axis, the coma aberration, the astigmatism and the distortion can be properly corrected.

According to the imaging lens having the above-described configuration, it is preferable that a shape of the fifth lens is biconvex shape having convex surfaces facing the object side and the image side near the optical axis.

When the fifth lens has the biconvex shape having the convex surfaces facing the object side and the image side near the optical axis, the positive refractive power of the both surfaces is advantageous for the low-profileness.

According to the imaging lens having the above-described configuration, it is preferable that the object-side surface of the sixth lens has the convex surface facing the object side near the optical axis.

When the object-side surface of the sixth lens has the convex surface facing the object side near the optical axis, the astigmatism, the field curvature and the distortion can be properly corrected.

According to the imaging lens having the above-described configuration, it is preferable that the object-side surface of the sixth lens is formed as the aspheric surface having the off-axial pole point.

When the object-side surface of the sixth lens is formed as the aspheric surface having the off-axial pole point, the field curvature and the distortion can be properly corrected and the light ray incident angle to the image sensor can be properly controlled.

According to the imaging lens having the above-described configuration, it is preferable that a below conditional expression (1) is satisfied:

$$11 < vd4 < 36 \quad (1)$$

where vd4: abbe number at d-ray of the fourth lens.

The conditional expression (1) defines an appropriate range of the abbe number at d-ray of the fourth lens. By satisfying the conditional expression (1), the chromatic aberration can be properly corrected.

According to the imaging lens having the above-described configuration, it is preferable that a below conditional expression (2) is satisfied:

$$2.0 < (T4/f) \times 100 < 7.6 \quad (2)$$

where

T4: distance along the optical axis from the image-side surface of the fourth lens to the object-side surface of the fifth lens, and f: focal length of the overall optical system of the imaging lens.

The conditional expression (2) defines an appropriate range of the distance along the optical axis from the image-side surface of the fourth lens to the object-side surface of the fifth lens. By satisfying the conditional expression (2), the total track length can be shortened, and the coma aberration, the field curvature and the distortion can be properly corrected.

According to the imaging lens having the above-described configuration, it is preferable that a below conditional expression (3) is satisfied:

$$-2.5 < (D2/f2) \times 100 < -0.7 \quad (3)$$

where

D2: thickness along the optical axis of the second lens, and f2: focal length of the second lens.

The conditional expression (3) defines an appropriate range of the thickness along the optical axis of the second lens. When a value is below the upper limit of the conditional expression (3), the thickness along the optical axis of the second lens is prevented from being too small, and formability of the lens becomes excellent. On the other hand, when the value is above the lower limit of the conditional expression (3), the thickness along the optical axis of the second lens is prevented from being too large, and an air gaps of the object side and the image side of the second lens can be easily secured. As a result, the low-profileness can be maintained.

According to the imaging lens having the above-described configuration, it is preferable that a below conditional expression (4) is satisfied:

$$0.03 < T1/T2 < 0.15 \quad (4)$$

where

T1: distance along the optical axis from the image-side surface of the first lens to the object-side surface of the second lens, and T2: distance along the optical axis from the image-side surface of the second lens to the object-side surface of the third lens.

The conditional expression (4) defines an appropriate range of an interval between the first lens and the second lens, and the interval between the second lens and the third lens. By satisfying the conditional expression (4), difference between the interval of the first lens and the second lens and the interval of the second lens and the third lens is suppressed from being increased, and the low-profileness is achieved.

According to the imaging lens having the above-described configuration, it is preferable that a below conditional expression (5) is satisfied:

$$0.55 < |r7|/f < 1.95 \quad (5)$$

where r7: paraxial curvature radius of the object-side surface of the fourth lens, and f: focal length of the overall optical system of the imaging lens.

The conditional expression (5) defines an appropriate range of the paraxial curvature radius of the object-side surface of the fourth lens. When a value is below the upper limit of the conditional expression (5), the coma aberration can be properly corrected. On the other hand, when the value is above the lower limit of the conditional expression (5), the spherical aberration and the distortion can be properly corrected.

According to the imaging lens having the above-described configuration, it is preferable that a below conditional expression (6) is satisfied:

$$3.5 < (T3/f) \times 100 < 11.5 \quad (6)$$

where

T3: distance along the optical axis from the image-side surface of the third lens to the object-side surface of the fourth lens, and f: focal length of the overall optical system of the imaging lens.

The conditional expression (6) defines an appropriate range of the distance along the optical axis from the image-side surface of the third lens to the object-side surface of the fourth lens. By satisfying the conditional expression (6), the total track length can be shortened, and the coma aberration, the field curvature and the distortion can be properly corrected.

According to the imaging lens having the above-described configuration, it is preferable that the refractive power of the fourth lens is negative near the optical axis, and more preferable that a below conditional expression (7) is satisfied:

$$-3.7 < f4/f < -0.8 \tag{7}$$

where f4: focal length of the fourth lens, and f: focal length of the overall optical system of the imaging lens.

By having the negative refractive power, the fourth lens properly corrects the chromatic aberration. Furthermore, the conditional expression (7) defines an appropriate range of the refractive power of the fourth lens. When a value is below the upper limit of the conditional expression (7), the negative refractive power of the fourth lens becomes appropriate, and the low-profileness is achieved. On the other hand, when the value is above the lower limit of the conditional expression (7), the chromatic aberration and the spherical aberration can be properly corrected.

According to the imaging lens having the above-described configuration, it is preferable that the refractive power of the fifth lens is positive near the optical axis, and more preferable that a below conditional expression (8) is satisfied:

$$0.3 < f5/f < 1.2 \tag{8}$$

where f5: focal length of the fifth lens, and f: focal length of the overall optical system of the imaging lens.

By having the positive refractive power, the fifth lens achieves the low-profileness. Furthermore, the conditional expression (8) defines an appropriate range of the refractive power of the fifth lens. When a value is below the upper limit of the conditional expression (8), the positive refractive power of the fifth lens becomes appropriate, and the low-profileness is achieved. On the other hand, when the value is above the lower limit of the conditional expression (8), the spherical aberration, the coma aberration and the distortion can be properly corrected.

According to the imaging lens having the above-described configuration, it is preferable that a below conditional expression (9) is satisfied:

$$-0.9 < f1/f4 < -0.2 \tag{9}$$

where f1: focal length of the first lens, and f4: focal length of the fourth lens.

The conditional expression (9) defines an appropriate range of the refractive power of the first lens and the fourth lens. When a value is below the upper limit of the conditional expression (9), the spherical aberration can be properly corrected. On the other hand, when the value is above the lower limit of the conditional expression (9), the refractive power of the first lens becomes appropriate and the low-profileness can be achieved. Furthermore, the distortion can be properly corrected.

According to the imaging lens having the above-described configuration, it is preferable that a below conditional expression (10) is satisfied:

$$-2.4 < r9/r10 < -0.5 \tag{10}$$

where r9: paraxial curvature radius of the object-side surface of the fifth lens, and r10: paraxial curvature radius of the image-side surface of the fifth lens.

The conditional expression (10) defines a shape of the object-side surface and the image-side surface of the fifth lens with a ratio of the paraxial curvature radii. By satisfying the conditional expression (10), the spherical aberration and the distortion can be properly corrected.

According to the imaging lens having the above-described configuration, it is preferable that a below conditional expression (11) is satisfied:

$$1.5 < r3/f < 6.3 \tag{11}$$

where r3: paraxial curvature radius of the object-side surface of the second lens, and f: focal length of the overall optical system of the imaging lens.

The conditional expression (11) defines an appropriate range of the paraxial curvature radius of the object-side surface of the second lens. When a value is below the upper limit of the conditional expression (11), the field curvature and the distortion can be properly corrected. On the other hand, when the value is above the lower limit of the conditional expression (11), the spherical aberration can be properly corrected.

According to the imaging lens having the above-described configuration, it is preferable that a below conditional expression (12) is satisfied:

$$0.35 < |r9|/f < 1.50 \tag{12}$$

where r9: paraxial curvature radius of the object-side surface of the fifth lens, and f: focal length of the overall optical system of the imaging lens.

The conditional expression (12) defines an appropriate range of the paraxial curvature radius of the object-side surface of the fifth lens. When a value is below the upper limit of the conditional expression (12), the astigmatism and the field curvature can be properly corrected. On the other hand, when the value is above the lower limit of the conditional expression (12), while maintaining refractive power of the object-side surface of the fifth lens, the spherical aberration and the distortion occurring at this surface are suppressed, and it becomes facilitated to reduce the sensitivity to the manufacturing error.

According to the imaging lens having the above-described configuration, it is preferable that a below conditional expression (13) is satisfied:

$$-1.2 < f6/f < -0.3 \tag{13}$$

where f6: focal length of the sixth lens, and f: focal length of the overall optical system of the imaging lens.

The conditional expression (13) defines an appropriate range of the refractive power of the sixth lens. When a value is below the upper limit of the conditional expression (13), the negative refractive power of the sixth lens becomes appropriate, and the low-profileness is achieved. On the other hand, when the value is above the lower limit of the conditional expression (13), the chromatic aberration, the field curvature and the distortion can be properly corrected.

According to the imaging lens having the above-described configuration, it is preferable that a below conditional expression (14) is satisfied:

$$-0.4 < f1/f2 < -0.1 \tag{14}$$

where
f1: focal length of the first lens, and
f2: focal length of the second lens.

The conditional expression (14) defines an appropriate range of the refractive power of the first lens and the second lens. When a value is below the upper limit of the conditional expression (14), the coma aberration, the astigmatism and the distortion can be properly corrected. On the other hand, when the value is above the lower limit of the conditional expression (14), the refractive power of the first lens becomes appropriate and the low-profileness can be achieved.

According to the imaging lens having the above-described configuration, it is preferable that composite refractive power of the second lens, the third lens and the fourth lens is negative, and more preferable that a below conditional expression (15) is satisfied:

$$-3.1 < f234/f < -0.7 \qquad (15)$$

where
f234: composite focal length of the second lens, the third lens and the fourth lens, and
f: focal length of the overall optical system of the imaging lens.

When the composite refractive power of the second lens, the third lens and the fourth lens is negative, the chromatic aberration can be properly corrected. Furthermore, the conditional expression (15) defines an appropriate range of the composite refractive power of the second lens, the third lens and the fourth lens. When a value is below the upper limit of the conditional expression (15), the negative composite refractive power of the second lens, the third lens and the fourth lens become appropriate, and the low-profileness can be achieved. On the other hand, when the value is above the lower limit of the conditional expression (15), the chromatic aberration and the spherical aberration can be properly corrected.

Effect of Invention

According to the present invention, there can be provided an imaging lens with high resolution which satisfies demand of the wide field of view, the low-profileness and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5 and 7 are schematic views of the imaging lenses in Examples 1 to 4 according to the embodiments of the present invention.

Figure 1:
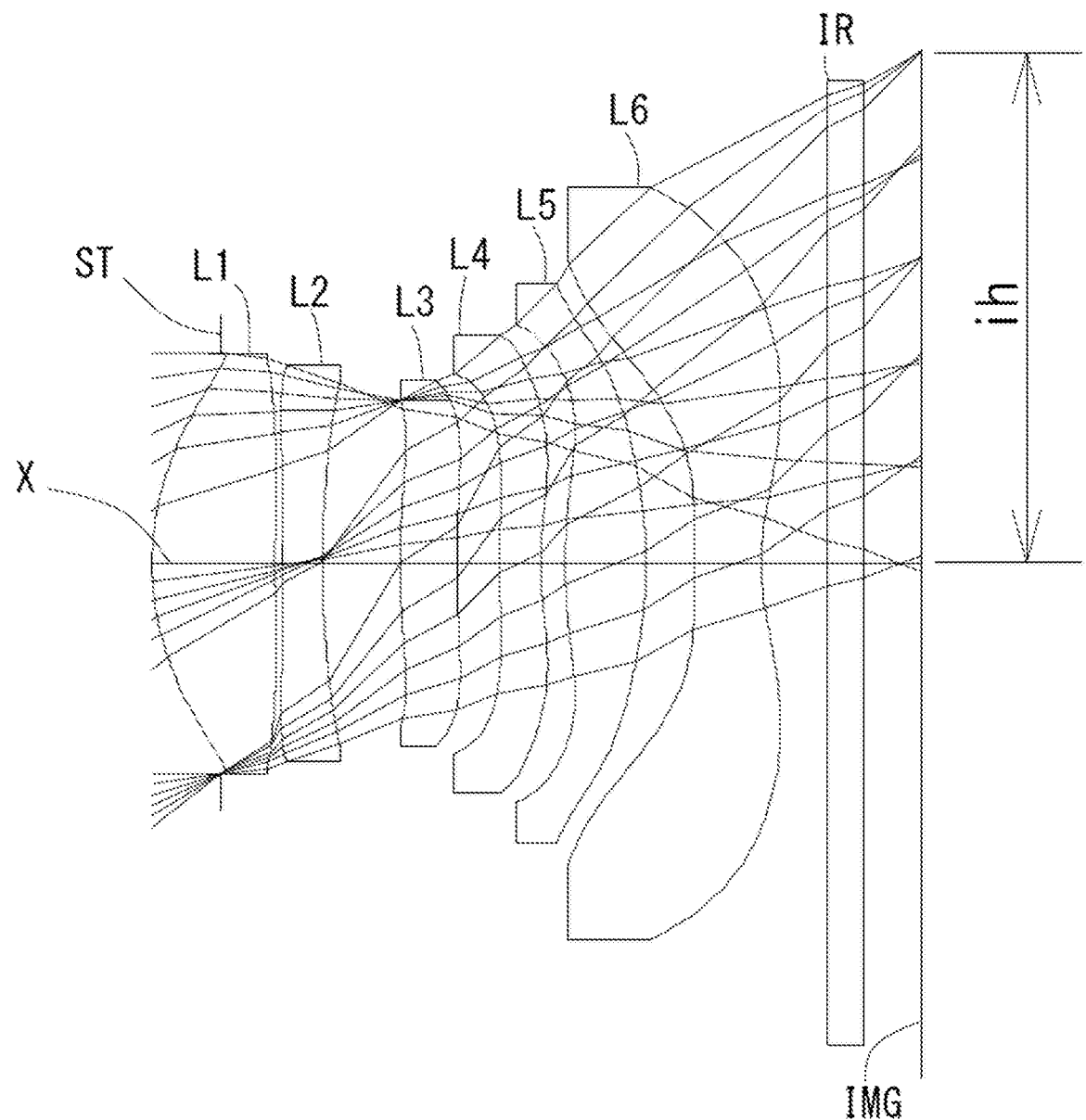
FIG. 1 is a schematic view showing a general configuration of an imaging lens in Example 1 according to the present invention.

As shown in FIG. 1, the imaging lens according to the present embodiments comprises, in order from an object side to an image side, a first lens L1 having positive refractive power and a convex surface facing the object side near the optical axis X, a second lens L2 having negative refractive power near the optical axis X, a third lens L3, a fourth lens L4, a fifth lens L5 and a sixth lens L6 having negative refractive power and a concave surface facing the image side near the optical axis X. The image-side surface of the sixth lens L6 is formed as an aspheric surface having at least one off-axial pole point.

A filter IR such as an IR cut filter and a cover glass is arranged between the sixth lens L6 and an image plane IMG (namely, the image plane of an image sensor). The filter IR is omissible.

An aperture stop ST is arranged on the object side of the first lens L1, and the aberration correction is facilitated and control of the light ray incident angle of high image height to the image sensor become facilitated. Furthermore, the aperture stop ST may be arranged between the second lens L2 and the third lens L3 as in Examples 3 and 4 shown in FIGS. 5 and 7. In this case, the aberration correction and the wide field of view are facilitated.

The first lens L1 has the positive refractive power, and achieves wide field of view and the low-profileness by strengthening the refractive power. A shape of the first lens L1 is a meniscus shape having a convex surface facing the object side and a concave surface facing the image side near an optical axis X, and the spherical aberration, the astigmatism and the distortion can be properly corrected.

The second lens L2 has the negative refractive power, and properly corrects the spherical aberration and the chromatic aberration occurring at the first lens L1. A shape of the second lens L2 is the meniscus shape having the convex surface facing the object side near the optical axis X, and the spherical aberration, the astigmatism, the field curvature and the distortion can be properly corrected.

The third lens L3 has the positive refractive power, and properly corrects the coma aberration, the astigmatism and the distortion. A shape of the third lens L3 is the meniscus shape having the convex surface facing the object side and the concave surface facing the image side near the optical axis X, and the coma aberration, the astigmatism, the field curvature and the distortion can be properly corrected.

The fourth lens L4 has the negative refractive power, and properly corrects the spherical aberration, the coma aberration, the astigmatism and the distortion. A shape of the fourth lens L4 is the meniscus shape having the convex surface facing the object side and the concave surface facing the image side near the optical axis X, and the coma aberration, the astigmatism and the distortion can be properly corrected.

The fifth lens L5 has the positive refractive power, and properly corrects the astigmatism, the field curvature and the distortion while maintaining the low-profileness. A shape of the fifth lens L5 is a biconvex shape having the convex surfaces facing the object side and the image side near the optical axis X, and the positive refractive power of the both surfaces is advantageous for the low-profileness.

The sixth lens L6 has the negative refractive power, and secures a back focus while maintaining the low-profileness. A shape of the sixth lens L6 is the meniscus shape having the convex surface facing the object side and the concave surface facing the image side near the optical axis X, and the astigmatism, the field curvature and the distortion can be properly corrected.

Furthermore, the object-side surface and the image-side surface of the sixth lens L6 are formed as the aspheric surface having the off-axial pole point, and the field curvature and the distortion are properly corrected and the light ray incident angle to the image sensor can be properly controlled.

Regarding the imaging lens according to the present embodiments, it is preferable that all lenses from the first lens L1 to the sixth lens L6 is single lens. Configuration consisting of only the single lenses can frequently use the aspheric surfaces. In the present embodiments, all lens-surfaces are formed as the appropriate aspherical surfaces, and proper aberration correction is made. In comparison with the case in which a cemented lens is used, workload is reduced, and manufacturing in low cost becomes possible.

Furthermore, the imaging lens according to the present embodiments makes manufacturing facilitated by using plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the below conditional expressions (1) to (15).

$$11 < vd4 < 36 \tag{1}$$

$$2.0 < (T4/f) \times 100 < 7.6 \tag{2}$$

$$-2.5 < (D2/f2) \times 100 < -0.7 \tag{3}$$

$$0.03 < T1/T2 < 0.15 \tag{4}$$

$$0.55 < |r7|/f < 1.95 \tag{5}$$

$$3.5 < (T3/f) \times 100 < 11.5 \tag{6}$$

$$-3.7 < f4/f < -0.8 \tag{7}$$

$$0.3 < f5/f < 1.2 \tag{8}$$

$$-0.9 < f1/f4 < -0.2 \tag{9}$$

$$-2.4 < r9/r10 < -0.5 \tag{10}$$

$$1.5 < r3/f < 6.3 \tag{11}$$

$$0.35 < |r9|/f < 1.50 \tag{12}$$

$$-1.2 < f6/f < -0.3 \tag{13}$$

$$-0.4 < f1/f2 < -0.1 \tag{14}$$

$$-3.1 < f234/f < -0.7 \tag{15}$$

where vd4: abbe number at d-ray of the fourth lens L4,

D2: thickness along the optical axis X of the second lens L2,

T1: distance along the optical axis X from the image-side surface of the first lens L1 to the object-side surface of the second lens L2, T2: distance along the optical axis X from the image-side surface of the second lens L2 to the object-side surface of the third lens L3, T3: distance along the optical axis X from the image-side surface of the third lens L3 to the object-side surface of the fourth lens L4, T4: distance along the optical axis X from the image-side surface of the fourth lens L4 to the object-side surface of the fifth lens L5, f: focal length of the overall optical system of the imaging lens, f1: focal length of the first lens L1, f2: focal length of the second lens L2, f4: focal length of the fourth lens L4, f5: focal length of the fifth lens L5, f6: focal length of the sixth lens L6, f234: composite focal length of the second lens L2, the third lens L3 and the fourth lens L4, r3: paraxial curvature radius of the object-side surface of the second lens L2, r7: paraxial curvature radius of the object-side surface of the fourth lens L4, r9: paraxial curvature radius of the object-side surface of the fifth lens L5, and r10: paraxial curvature radius of the image-side surface of the fifth lens L5.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (15a).

$$17 < vd4 < 29 \tag{1a}$$

$$3.0 < (T4/f) \times 100 < 6.3 \tag{2a}$$

$$-2.0 < (D2/f2) \times 100 < -1.1 \tag{3a}$$

$$0.05 < T1/T2 < 0.12 \tag{4a}$$

$$0.85 < |r7|/f < 1.60 \tag{5a}$$

$$5.0 < (T3/f) \times 100 < 9.5 \tag{6a}$$

$$-3.1 < f4/f < -1.3 \tag{7a}$$

$$0.50 < f5/f < 0.95 \tag{8a}$$

$-0.75<f1/f4<-0.30$ (9a)

$-2.0<r9/r10<-0.8$ (10a)

$2.5<r3/f<5.2$ (11a)

$0.55<|r9|/f<1.25$ (12a)

$-0.95<f6/f<-0.50$ (13a)

$-0.3f1/f2<-0.15$ (14a)

$-2.6<f234/f<-1.0$ (15a)

The signs in the above conditional expressions have the same meanings as those in the paragraph before the preceding paragraph.

In this embodiment, the aspheric shapes of the surfaces of the aspheric lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14 and A16 denote aspheric surface coefficients.

$$Z = \frac{\frac{H^2}{R}}{1+\sqrt{1-(k+1)\frac{H^2}{R^2}}} + A_4H^4 + A_6H^6 +$$

$$A_8H^8 + A_{10}H^{10} + A_{12}H^{12} + A_{14}H^{14} + A_{16}H^{16}$$

Equation 1

Next, examples of the imaging lens according to this embodiment will be explained. In each example, f denotes the focal length of the overall optical system of the imaging lens, Fno denotes an F-number, ω denotes a half field of view, ih denotes a maximum image height, and TTL denotes a total track length. Additionally, i denotes surface number counted from the object side, r denotes a curvature radius, d denotes the distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

| Example 1 |
| --- |

| Unit mm |
| --- |

| f = 3.44 | ih = 2.91 |
| Fno = 1.4 | TTL = 4.30 |
| ω (°) = 38.2 | |

| Surface Data | | | | |
| --- | --- | --- | --- | --- |
| Surface Number i | Curvature Radius r | Surface Distance d | Refractive Index Nd | Abbe Number vd |
| (Object) | Infinity | Infinity | | |
| 1 (Stop) | Infinity | −0.3900 | | |
| 2* | 1.6094 | 0.6977 | 1.544 | 55.57 (vd1) |
| 3* | 9.3835 | 0.0397 | | |
| 4* | 11.9664 | 0.2300 | 1.661 | 20.37 (vd2) |
| 5* | 5.2011 | 0.4398 | | |
| 6* | 4.1175 | 0.3243 | 1.544 | 55.57 (vd3) |
| 7* | 5.6753 | 0.2409 | | |
| 8* | 4.3770 | 0.2361 | 1.639 | 23.52 (vd4) |
| 9* | 2.0019 | 0.1384 | | |
| 10* | 2.9677 | 0.4602 | 1.544 | 55.57 (vd5) |
| 11* | −2.2917 | 0.2723 | | |
| 12* | 19.6142 | 0.3800 | 1.544 | 55.57 (vd6) |
| 13* | 1.3006 | 0.3700 | | |
| 14 | Infinity | 0.2100 | 1.517 | 64.20 |
| 15 | Infinity | 0.3276 | | |
| Image Plane | Infinity | | | |

| Constituent Lens Data | | | | |
| --- | --- | --- | --- | --- |
| Lens | Start Surface | Focal Length | | Composite Focal Length |
| 1 | 2 | 3.463 | f234 | −4.915 |
| 2 | 4 | −14.114 | | |
| 3 | 6 | 25.699 | | |
| 4 | 8 | −6.005 | | |
| 5 | 10 | 2.453 | | |
| 6 | 12 | −2.580 | | |

| Aspheric Surface Data | | | | | | |
| --- | --- | --- | --- | --- | --- | --- |
| | Second Surface | Third Surface | Fourth Surface | Fifth Surface | Sixth Surface | Seventh Surface |
| k | 4.967035E−01 | −2.688782E+01 | 9.000000E+01 | −1.856577E+01 | −9.000000E+01 | 2.472940E+01 |
| A4 | −5.555494E−02 | −1.526273E−01 | −2.108436E−01 | −3.756019E−02 | 1.235746E−02 | −1.394801E−01 |
| A6 | 8.572612E−02 | 1.045746E−01 | 2.835538E−01 | 5.608209E−02 | −6.218280E−02 | 1.208818E−01 |
| A8 | −1.718496E−01 | 9.773003E−02 | −1.205436E−01 | 3.736784E−02 | −2.038960E−01 | −3.767377E−01 |

TABLE 1-continued

| | | | Example 1 | | | |
|---|---|---|---|---|---|---|
| A10 | 1.382639E−01 | −2.286096E−01 | −6.208203E−02 | −7.567982E−02 | 3.895483E−01 | 3.669745E−01 |
| A12 | −6.006648E−02 | 1.423253E−01 | 7.684567E−02 | 7.091145E−03 | −3.489239E−01 | −2.381596E−01 |
| A14 | 5.064121E−03 | −3.073652E−02 | −1.739348E−02 | 2.009295E−02 | 1.175107E−01 | 6.249413E−02 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 5.516206E+00 | −1.745471E+01 | −6.520200E−01 | −2.603744E+00 | 9.000000E+01 | −1.028107E+01 |
| A4 | −4.192880E−01 | −3.059849E−01 | −8.561753E−02 | 4.071701E−02 | −5.253138E−01 | −1.717883E−01 |
| A6 | 4.356567E−01 | 1.740502E−01 | −6.962971E−02 | 1.331782E−01 | 4.277920E−01 | 9.521773E−02 |
| A8 | −2.237165E−01 | −7.340010E−02 | 4.220132E−03 | −3.153323E−01 | −2.728194E−01 | −3.981095E−02 |
| A10 | −2.804664E−01 | −1.242653E−01 | −5.916369E−02 | 2.336124E−01 | 1.326861E−01 | 1.124559E−02 |
| A12 | 3.576753E−01 | 2.915231E−01 | 9.270319E−02 | −8.297637E−02 | −3.917612E−02 | −2.058028E−03 |
| A14 | −6.906181E−02 | −1.937360E−01 | −3.677506E−02 | 1.462006E−02 | 6.065312E−03 | 2.131075E−04 |
| A16 | −5.671833E−02 | 4.110195E−02 | 2.755416E−03 | −1.086163E−03 | −3.791973E−04 | −9.911666E−06 |

The imaging lens in Example 1 satisfies conditional expressions (1) to (15) as shown in Table 5.

Figure 2:
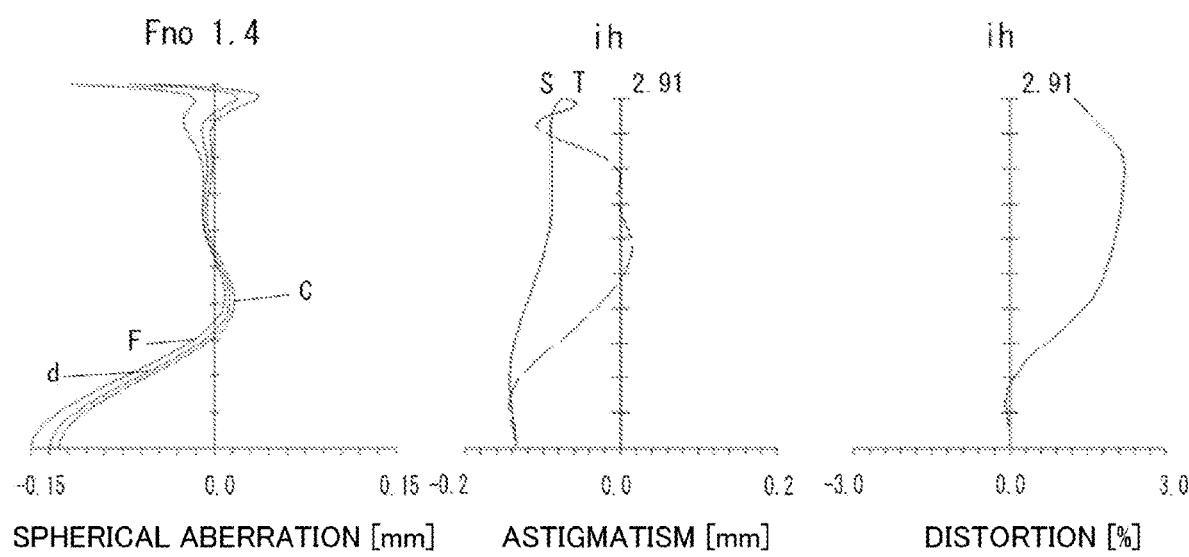
FIG. 2 shows spherical aberration, astigmatism, and distortion of the imaging lens in Example 1 according to the present invention.
Figure 3:
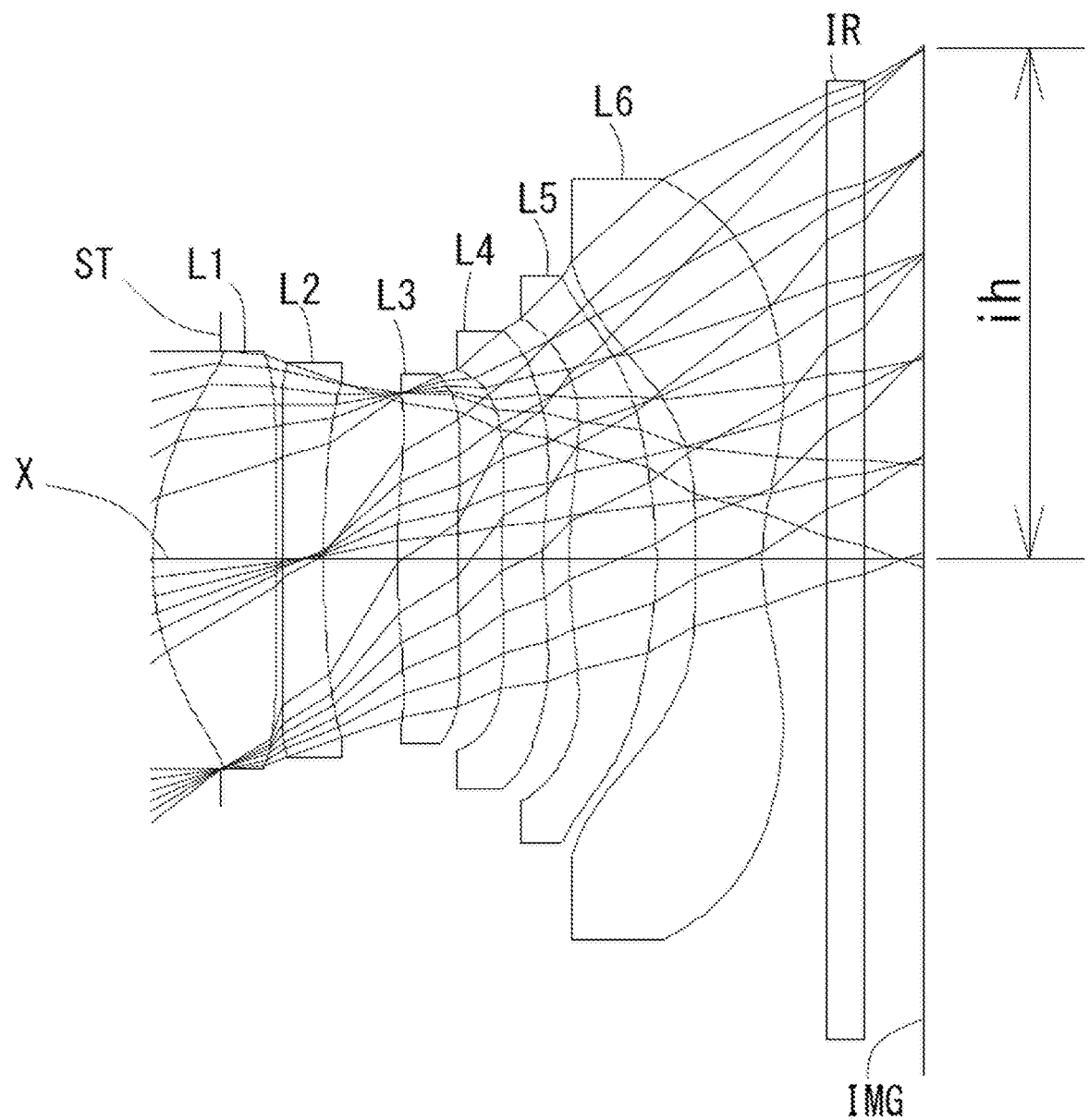
FIG. 3 is a schematic view showing the general configuration of an imaging lens in Example 2 according to the present invention.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6 and 8).

Example 2

The basic lens data is shown below in Table 2.

TABLE 2

Example 2

Unit mm f = 3.48    ih = 2.91
Fno = 1.4    TTL = 4.32
ω (°) = 38.3

Surface Data

| Surface Number i | Curvature Radius r | Surface Distance d | Refractive Index Nd | Abbe Number vd |
|---|---|---|---|---|
| (Object) | Infinity | Infinity | | |
| 1 (Stop) | Infinity | −0.3900 | | |
| 2* | 1.6269 | 0.7020 | 1.544 | 55.57 (vd1) |
| 3* | 8.3877 | 0.0419 | | |
| 4* | 11.8788 | 0.2300 | 1.661 | 20.37 (vd2) |
| 5* | 5.4986 | 0.4227 | | |
| 6* | 4.3162 | 0.3429 | 1.544 | 55.57 (vd3) |
| 7* | 5.8420 | 0.2515 | | |
| 8* | 4.0944 | 0.2347 | 1.639 | 23.52 (vd4) |
| 9* | 2.2752 | 0.1512 | | |
| 10* | 3.3505 | 0.4942 | 1.544 | 55.57 (vd5) |
| 11* | −2.3338 | 0.2213 | | |
| 12* | 19.0931 | 0.3800 | 1.544 | 55.57 (vd6) |
| 13* | 1.2266 | 0.3700 | | |
| 14 | Infinity | 0.2100 | 1.517 | 64.20 |
| 15 | Infinity | 0.3358 | | |
| Image Plane | Infinity | | | |

Constituent Lens Data

| Lens | Start Surface | Focal Length | | Composite Focal Length |
|---|---|---|---|---|
| 1 | 2 | 3.581 | f234 | −6.673 |
| 2 | 4 | −15.719 | | |
| 3 | 6 | 28.161 | | |
| 4 | 8 | −8.436 | | |
| 5 | 10 | 2.609 | | |
| 6 | 12 | −2.429 | | |

TABLE 2-continued

Example 2

Aspheric Surface Data

|     | Second Surface | Third Surface | Fourth Surface | Fifth Surface | Sixth Surface | Seventh Surface |
|-----|----------------|---------------|----------------|---------------|---------------|-----------------|
| k   | 4.674292E−01   | −6.642430E+01 | 9.000000E+01   | −1.534102E+01 | −9.000000E+01 | 2.368849E+01    |
| A4  | −5.436709E−02  | −1.534125E−01 | −2.105661E−01  | −3.471366E−02 | 2.186688E−02  | −1.453991E−01   |
| A6  | 8.625409E−02   | 1.046284E−01  | 2.827697E−01   | 6.231902E−02  | −5.154471E−02 | 1.432295E−01    |
| A8  | −1.719724E−01  | 9.712010E−02  | −1.201174E−01  | 3.845416E−02  | −1.927084E−01 | −3.551228E−01   |
| A10 | 1.385664E−01   | −2.292563E−01 | −6.135078E−02  | −7.898329E−02 | 3.955738E−01  | 3.576395E−01    |
| A12 | −5.966951E−02  | 1.430458E−01  | 7.682668E−02   | 7.286037E−03  | −3.542074E−01 | −2.583263E−01   |
| A14 | 5.261949E−03   | −3.163729E−02 | −1.817577E−02  | 2.571477E−02  | 1.229529E−01  | 7.900652E−02    |
| A16 | 0.000000E+00   | 0.000000E+00  | 0.000000E+00   | 0.000000E+00  | 0.000000E+00  | 0.000000E+00    |

|     | Eighth Surface | Ninth Surface | Tenth Surface | Eleventh Surface | Twelfth Surface | Thirteenth Surface |
|-----|----------------|---------------|---------------|------------------|-----------------|---------------------|
| k   | 5.575416E+00   | −2.008031E+01 | 2.228684E+00  | −8.896047E+00    | 9.000000E+01    | −9.083602E+00       |
| A4  | −4.188360E−01  | −3.088397E−01 | −6.219145E−02 | 2.744640E−02     | −5.261346E−01   | −1.860829E−01       |
| A6  | 4.444972E−01   | 1.914914E−01  | −8.776622E−02 | 1.249411E−01     | 4.265122E−01    | 1.062952E−01        |
| A8  | −2.308657E−01  | −7.229759E−02 | 3.578921E−03  | −3.153029E−01    | −2.726456E−01   | −4.238918E−02       |
| A10 | −2.785255E−01  | −1.285472E−01 | −5.660369E−02 | 2.341448E−01     | 1.327908E−01    | 1.138713E−02        |
| A12 | 3.685006E−01   | 2.886875E−01  | 9.260148E−02  | −8.285056E−02    | −3.915949E−02   | −2.032684E−03       |
| A14 | −6.578524E−02  | −1.936005E−01 | −3.729032E−02 | 1.481650E−02     | 6.064388E−03    | 2.129837E−04        |
| A16 | −7.178390E−02  | 4.189695E−02  | 3.120460E−03  | −1.094056E−03    | −3.810985E−04   | −1.021343E−05       |

The imaging lens in Example 2 satisfies conditional expressions (1) to (15) as shown in Table 5.

Figure 4:
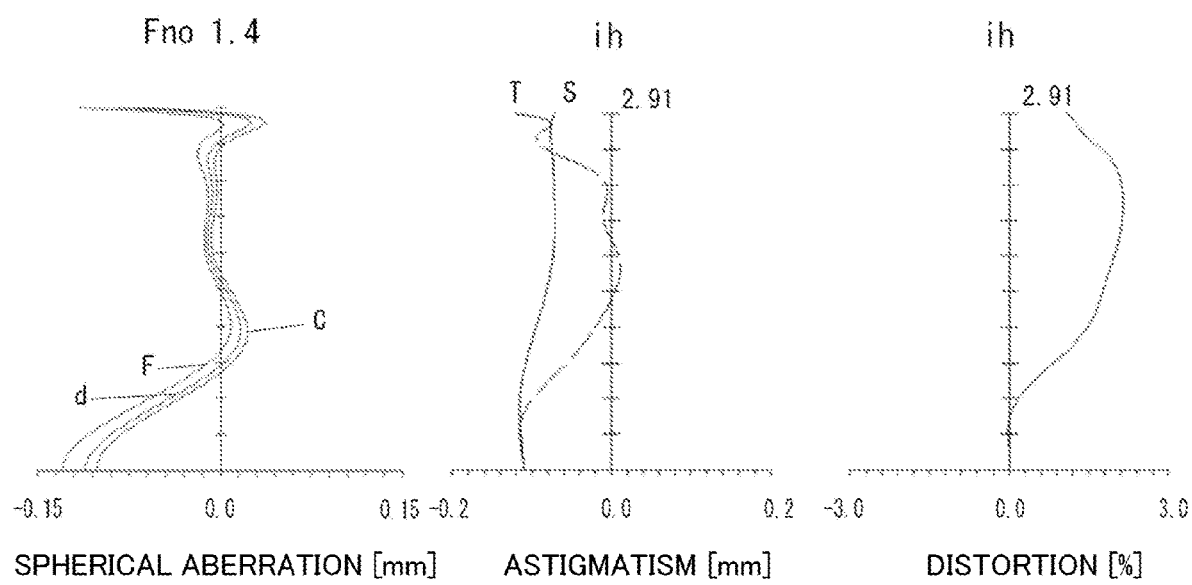
FIG. 4 shows spherical aberration, astigmatism, and distortion of the imaging lens in Example 2 according to the present invention.
Figure 5:
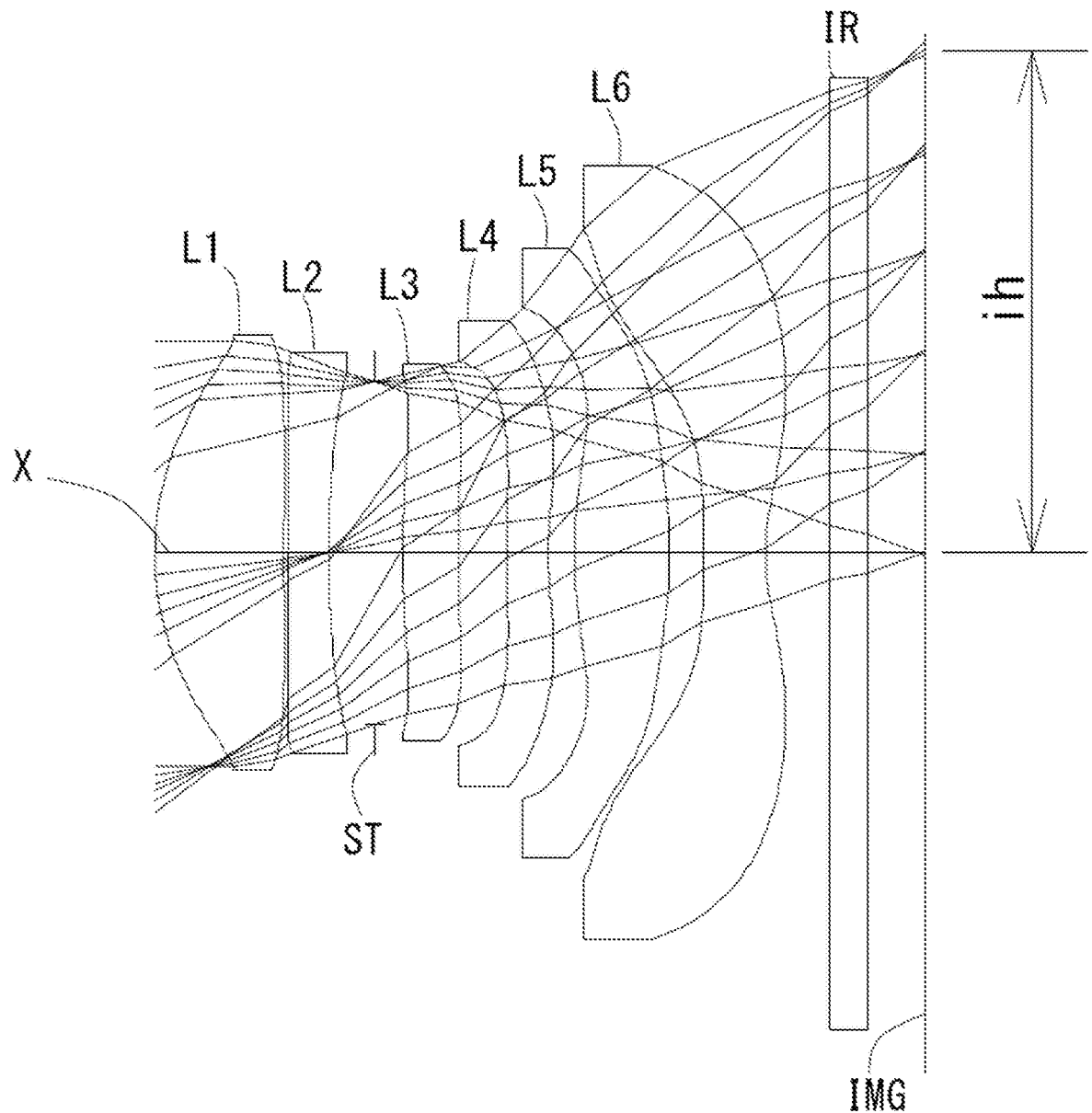
FIG. 5 is a schematic view showing the general configuration of an imaging lens in Example 3 according to the present invention.

FIG. 4 shows the spherical aberration (mm), the astigmatism (mm), and the distortion (%) of the imaging lens in Example 2.

Example 3

The basic lens data is shown below in Table 3.

TABLE 3

Example 3

Unit mm f = 3.62   ih = 2.91
Fno = 1.4   TTL = 4.34
ω (°) = 38.3

Surface Data

| Surface Number i | Curvature Radius r | Surface Distance d | Refractive Index Nd | Abbe Number νd |
|------------------|--------------------|--------------------|---------------------|----------------|
| (Object)         | Infinity           | Infinity           |                     |                |
| 1*               | 1.63857            | 0.7395             | 1.544               | 55.57 (vd1)    |
| 2*               | 8.0871             | 0.0282             |                     |                |
| 3*               | 15.0991            | 0.2300             | 1.661               | 20.37 (vd2)    |
| 4*               | 6.2513             | 0.2651             |                     |                |
| 5 (Stop)         | Infinity           | 0.1584             |                     |                |
| 6*               | 5.1327             | 0.3183             | 1.544               | 55.57 (vd3)    |
| 7*               | 6.7234             | 0.2744             |                     |                |
| 8*               | 4.4365             | 0.2412             | 1.639               | 23.52 (vd4)    |
| 9*               | 2.2014             | 0.1506             |                     |                |
| 10*              | 2.6750             | 0.5452             | 1.544               | 55.57 (vd5)    |
| 11*              | −2.4043            | 0.1900             |                     |                |
| 12*              | 19.2401            | 0.3596             | 1.544               | 55.57 (vd6)    |
| 13*              | 1.2194             | 0.3700             |                     |                |
| 14               | Infinity           | 0.2100             | 1.517               | 64.20          |
| 15               | Infinity           | 0.3294             |                     |                |
| Image Plane      | Infinity           |                    |                     |                |

Constituent Lens Data

| Lens | Start Surface | Focal Length |      | Composite Focal Length |
|------|---------------|--------------|------|------------------------|
| 1    | 1             | 3.632        | f234 | −5.576                 |
| 2    | 3             | −16.314      |      |                        |
| 3    | 6             | 37.266       |      |                        |

TABLE 3-continued

Example 3

| | | |
|---|---|---|
| 4 | 8 | −7.137 |
| 5 | 10 | 2.420 |
| 6 | 12 | −2.411 |

Aspheric Surface Data

| | First Surface | Second Surface | Third Surface | Fourth Surface | Sixth Surface | Seventh Surface |
|---|---|---|---|---|---|---|
| k   | 4.292635E−01  | −4.673005E+02 | 9.000000E+01  | −9.000000E+01 | −9.000000E+01 | 3.050070E+01  |
| A4  | −4.764840E−02 | −1.231120E−01 | −1.920483E−01 | 1.503460E−02  | 1.425028E−02  | −1.281827E−01 |
| A6  | 7.816589E−02  | 1.082146E−01  | 2.857160E−01  | 3.320769E−02  | −4.453322E−02 | 1.594509E−01  |
| A8  | −1.607793E−01 | −9.125536E−02 | −1.234023E−01 | 1.663734E−02  | −1.657714E−01 | −3.624213E−01 |
| A10 | 1.402530E−01  | −2.334920E−01 | −7.067358E−02 | −6.149833E−02 | 3.937586E−01  | 3.833063E−01  |
| A12 | −6.128964E−02 | 1.413819E−01  | 7.430328E−02  | 2.286959E−02  | −3.888770E−01 | −2.709135E−01 |
| A14 | 6.309933E−03  | −2.856066E−02 | −1.367259E−02 | 8.818410E−03  | 1.384630E−01  | 7.681260E−02  |
| A16 | 0.000000E+00  | 0.000000E+00  | 0.000000E+00  | 0.000000E+00  | 0.000000E+00  | 0.000000E+00  |

| | Eighth Surface | Ninth Surface | Tenth Surface | Eleventh Surface | Twelfth Surface | Thirteenth Surface |
|---|---|---|---|---|---|---|
| k   | 7.577463E+00  | −2.262531E+01 | 4.246122E−01  | −2.146051E+01 | 9.000000E+01  | −9.891763E+00 |
| A4  | −4.104396E−01 | −3.031196E−01 | −6.972641E−02 | 2.532353E−02  | −5.009980E−01 | −1.860990E−01 |
| A6  | 4.341799E−01  | 1.782258E−01  | −8.223397E−02 | 1.260623E−01  | 4.235586E−01  | 1.099991E−01  |
| A8  | −2.103227E−01 | −6.977898E−02 | 1.314064E−03  | −3.154896E−01 | −2.725211E−01 | −4.351227E−02 |
| A10 | −2.678530E−01 | −1.252425E−01 | −6.064637E−02 | 2.342039E−01  | 1.326518E−01  | 1.145726E−02  |
| A12 | 3.506000E−01  | 2.892027E−01  | 9.249015E−02  | −8.283409E−02 | −3.922772E−02 | −2.018059E−03 |
| A14 | −6.425914E−02 | −1.933433E−01 | −3.579175E−02 | 1.462390E−02  | 6.054290E−03  | 2.134426E−04  |
| A16 | −6.100393E−02 | 4.183590E−02  | 3.161054E−03  | −1.111762E−03 | −3.754109E−04 | −1.063284E−05 |

The imaging lens in Example 3 satisfies conditional expressions (1) to (15) as shown in Table 5.

Figure 6:
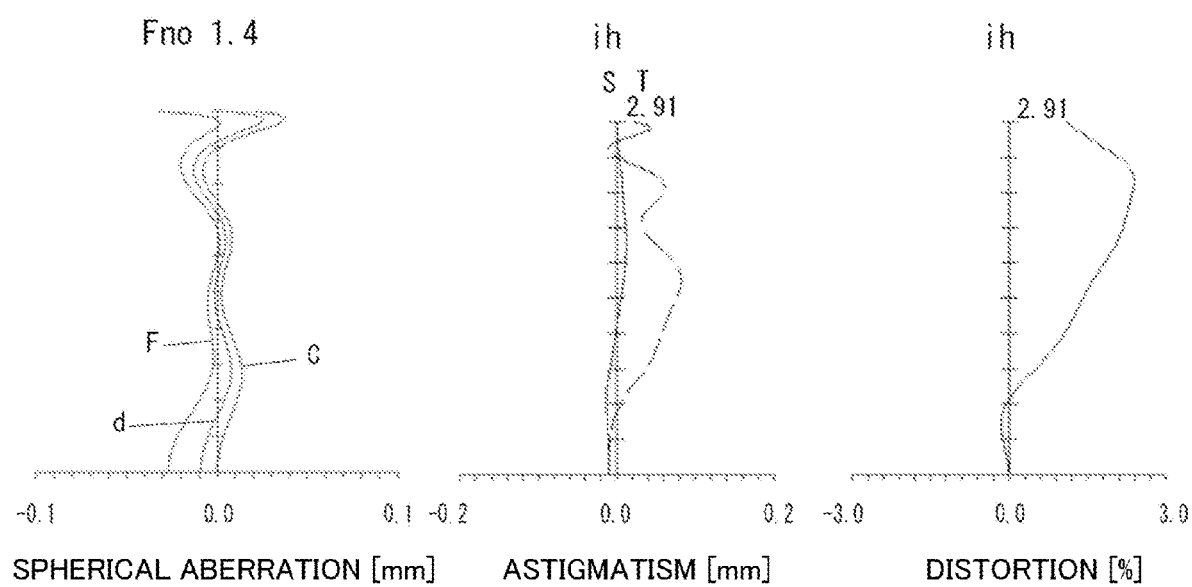
FIG. 6 shows spherical aberration, astigmatism, and distortion of the imaging lens in Example 3 according to the present invention.
Figure 7:
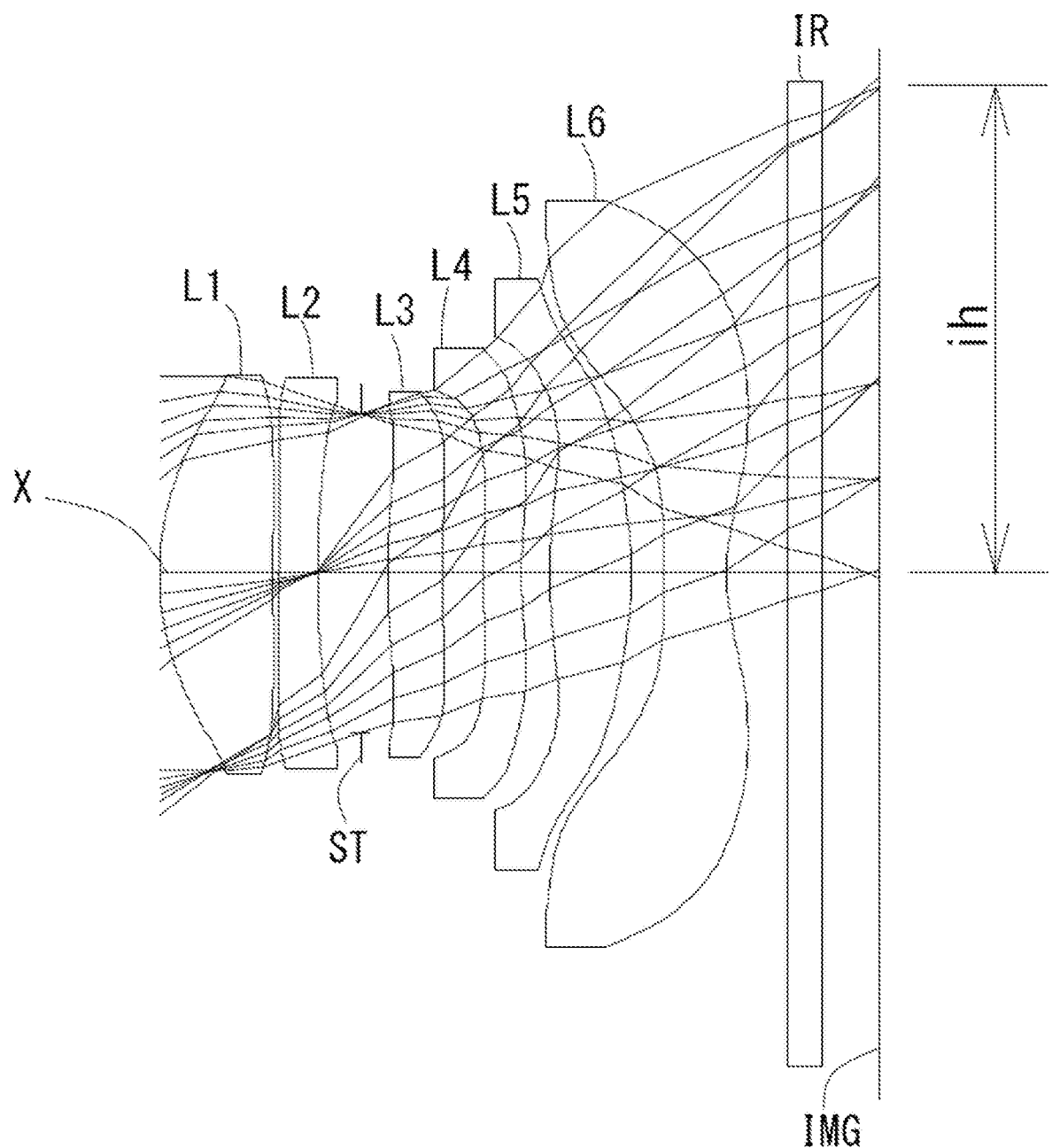
FIG. 7 is a schematic view showing the general configuration of an imaging lens in Example 4 according to the present invention.

FIG. 6 shows the spherical aberration (mm), the astigmatism (mm), and the distortion (%) of the imaging lens in Example 3.

Example 4

The basic lens data is shown below in Table 4.

TABLE 4

Example 4

Unit mm f = 3.44  ih = 2.91
Fno = 1.4  TTL = 3.61
ω (°) = 38.3

Surface Data

| Surface Number i | Curvature Radius r | Surface Distance d | Refractive Index Nd | Abbe Number νd |
|---|---|---|---|---|
| (Object) | Infinity | Infinity | | |
| 1*  | 1.626946 | 0.6886 | 1.544 | 55.57 (vd1) |
| 2*  | 8.2213   | 0.0420 | | |
| 3*  | 11.8535  | 0.2300 | 1.661 | 20.37 (vd2) |
| 4*  | 5.6089   | 0.2580 | | |
| 5 (Stop) | Infinity | 0.1683 | | |
| 6*  | 4.1755   | 0.3303 | 1.544 | 55.57 (vd3) |
| 7*  | 5.8629   | 0.2499 | | |
| 8*  | 4.0431   | 0.2290 | 1.639 | 23.52 (vd4) |
| 9*  | 2.2648   | 0.1740 | | |
| 10* | 3.3705   | 0.4967 | 1.544 | 55.57 (vd5) |
| 11* | −2.1389  | 0.1949 | | |
| 12* | 19.3162  | 0.3800 | 1.544 | 55.57 (vd6) |
| 13* | 1.1600   | 0.3700 | | |
| 14  | Infinity | 0.2100 | 1.517 | 64.20 |
| 15  | Infinity | 0.3484 | | |
| Image Plane | Infinity | | | |

TABLE 4-continued

Example 4

Constituent Lens Data

| Lens | Start Surface | Focal Length | | Composite Focal Length |
|---|---|---|---|---|
| 1 | 1 | 3.598 | f234 | −7.077 |
| 2 | 3 | −16.353 | | |
| 3 | 6 | 24.956 | | |
| 4 | 8 | −8.482 | | |
| 5 | 10 | 2.485 | | |
| 6 | 12 | −2.286 | | |

Aspheric Surface Data

| | First Surface | Second Surface | Third Surface | Fourth Surface | Sixth Surface | Seventh Surface |
|---|---|---|---|---|---|---|
| k | 4.650145E−01 | −6.807935E+01 | 9.000000E+01 | −1.641581E+01 | −9.000000E+01 | 2.579662E+01 |
| A4 | −5.436606E−02 | −1.534084E−01 | −2.101424E−01 | −3.474483E−02 | 2.058137E−02 | −1.440144E−01 |
| A6 | 8.502136E−02 | 1.045000E−01 | 2.831234E−01 | 6.303872E−02 | −4.805426E−02 | 1.410286E−01 |
| A8 | −1.720221E−01 | 9.714180E−02 | −1.201909E−01 | 3.900853E−02 | −1.925217E−01 | −3.599600E−01 |
| A10 | 1.386486E−01 | −2.293090E−01 | −6.146194E−02 | −7.878531E−02 | 3.902814E−01 | 3.567147E−01 |
| A12 | −5.963227E−02 | 1.430207E−01 | 7.651942E−02 | 7.245198E−03 | −3.497843E−01 | −2.553186E−01 |
| A14 | 5.329615E−03 | −3.171423E−02 | −1.864680E−02 | 2.511084E−02 | 1.257731E−01 | 8.011225E−02 |
| A16 | 0.000000E+00 | 0.000000E+00 | 0.000000E+00 | 0.000000E+00 | 0.000000E+00 | 0.000000E+00 |

| | Eighth Surface | Ninth Surface | Tenth Surface | Eleventh Surface | Twelfth Surface | Thirteenth Surface |
|---|---|---|---|---|---|---|
| k | 5.778851E+00 | −1.975464E+01 | 2.425331E+00 | −9.704061E+00 | 9.000000E+01 | −8.407133E+00 |
| A4 | −4.183232E−01 | −3.118326E−01 | −6.006068E−02 | 2.620193E−02 | −5.211330E−01 | −1.832961E−01 |
| A6 | 4.437189E−01 | 1.970768E−01 | −8.520303E−02 | 1.251110E−01 | 4.270640E−01 | 1.058335E−01 |
| A8 | −2.279514E−01 | −6.575957E−02 | 5.917753E−04 | −3.149448E−01 | −2.725782E−01 | −4.258133E−02 |
| A10 | −2.746843E−01 | −1.282865E−01 | −5.784861E−02 | 2.342704E−01 | 1.327608E−01 | 1.141069E−02 |
| A12 | 3.688652E−01 | 2.868699E−01 | 9.354924E−02 | −8.280206E−02 | −3.918463E−02 | −2.029144E−03 |
| A14 | −6.627791E−02 | −1.934900E−01 | −3.691356E−02 | 1.481968E−02 | 6.062707E−03 | 2.134956E−04 |
| A16 | −7.191544E−02 | 4.205677E−02 | 3.234076E−03 | −1.103796E−03 | −3.796598E−04 | −1.041536E−05 |

The imaging lens in Example 4 satisfies conditional expressions (1) to (15) as shown in Table 5.

Figure 8:
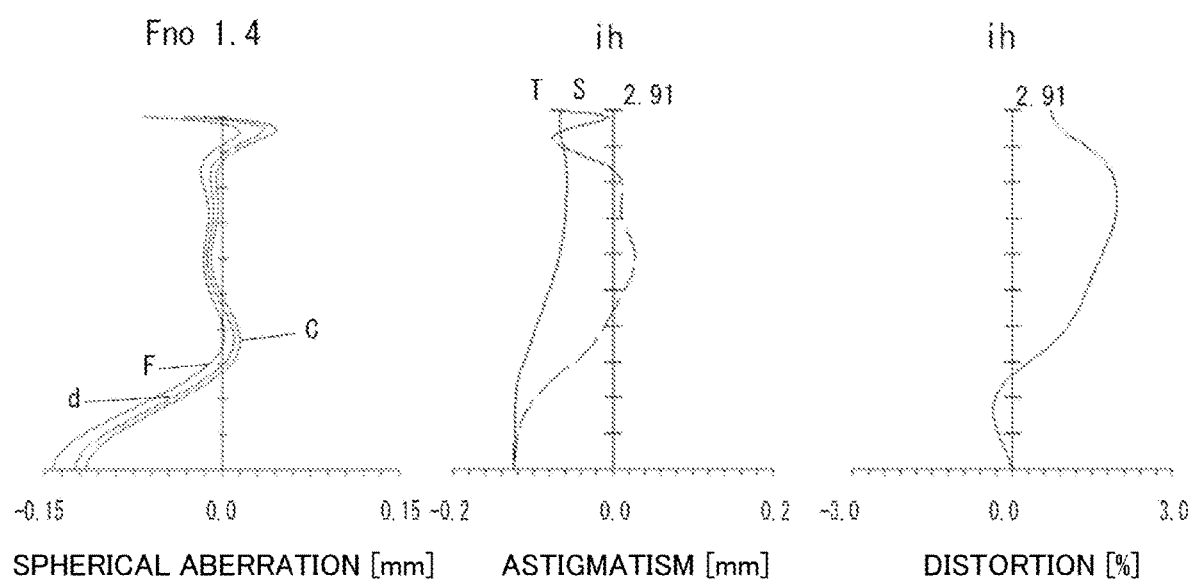
FIG. 8 shows spherical aberration, astigmatism, and distortion of the imaging lens in Example 4 according to the present invention.

FIG. 8 shows the spherical aberration (mm), the astigmatism (mm), and the distortion (%) of the imaging lens in Example 4.

In table 5, values of conditional expressions (1) to (15) related to the Examples 1 to 4 are shown.

TABLE 5

| Conditional expression | | Example 1 | Example 2 | Example 3 | Example 4 |
|---|---|---|---|---|---|
| (1) | vd4 | 23.52 | 23.52 | 23.52 | 23.52 |
| (2) | (T4/f) × 100 | 4.03 | 4.34 | 4.15 | 5.06 |
| (3) | (D2/f2) × 100 | −1.63 | −1.46 | −1.41 | −1.41 |
| (4) | T1/T2 | 0.09 | 0.10 | 0.07 | 0.10 |
| (5) | |r7|/f | 1.27 | 1.18 | 1.22 | 1.18 |
| (6) | (T3/f) × 100 | 7.00 | 7.23 | 7.57 | 7.27 |
| (7) | f4/f | −1.75 | −2.42 | −1.97 | −2.47 |
| (8) | f5/f | 0.71 | 0.75 | 0.67 | 0.72 |
| (9) | f1/f4 | −0.58 | −0.42 | −0.51 | −0.42 |
| (10) | r9/r10 | −1.29 | −1.44 | −1.11 | −1.58 |
| (11) | r3/f | 3.48 | 3.41 | 4.17 | 3.45 |
| (12) | |r9|/f | 0.86 | 0.96 | 0.74 | 0.98 |
| (13) | f6/f | −0.75 | −0.70 | −0.67 | −0.67 |
| (14) | f1/f2 | −0.25 | −0.23 | −0.22 | −0.22 |
| (15) | f234/f | −1.43 | −1.92 | −1.54 | −2.06 |

When the imaging lens according to the present invention is adopted to a product with the camera function, there is realized contribution to the wide field of view, the low-profileness and the low F-number of the camera and also high performance thereof.

DESCRIPTION OF REFERENCE NUMERALS

ST: an aperture stop
L1: first lens
L2: second lens
L3: third lens
L4: fourth lens
L5: fifth lens
L6: sixth lens ih: maximum image height
IR: filter
IMG: imaging plane

What is claimed is:
1. An imaging lens comprising in order from an object side to an image side,
a first lens having positive refractive power and a convex surface facing the object side near the optical axis,
a second lens having negative refractive power near the optical axis,
a third lens,
a fourth lens,
a fifth lens and
a sixth lens having negative refractive power and a concave surface facing the image side near the optical axis, wherein the image-side surface of said sixth lens is formed as an aspheric surface having at least one off-axial pole point, the image-side surface of said first lens has the concave surface facing the image side near the optical axis, the image-side surface of said third lens has the concave surface facing the image side near the optical axis, said fifth lens has a biconvex shape having the convex surfaces facing the object side and the image side near the optical axis, the object-side surface of the sixth lens has the convex surface facing the object side near the optical axis, and below conditional expressions (1), (2), and (10) are satisfied:

$$11 < vd4 < 36 \tag{1}$$

$$2.0 < (T4/f) \times 100 < 7.6 \tag{2}$$

$$-2.4 < r9/r10 < -0.5 \tag{10}$$

where vd4: abbe number at d-ray of the fourth lens,

T4: distance along the optical axis from the image-side surface of the fourth lens to the object-side surface of the fifth lens, f: focal length of the overall optical system of the imaging lens, r9: paraxial curvature radius of the object-side surface of the fifth lens, and r10: paraxial curvature radius of the image-side surface of the fifth lens.

2. The imaging lens according to claim 1, wherein a below conditional expression (6) is satisfied:

$$3.5 < (T3/f) \times 100 < 11.5 \tag{6}$$

where

T3: distance along the optical axis from the image-side surface of the third lens to the object-side surface of the fourth lens, and f: focal length of the overall optical system of the imaging lens.

3. The imaging lens according to claim 1, wherein a below conditional expression (4) is satisfied:

$$0.03 < T1/T2 < 0.15 \tag{4}$$

where

T1: distance along the optical axis from the image-side surface of the first lens to the object-side surface of the second lens, and T2: distance along the optical axis from the image-side surface of the second lens to the object-side surface of the third lens.

4. The imaging lens according to claim 1, wherein a below conditional expression (7) is satisfied:

$$-3.7 < f4/f < -0.8 \tag{7}$$

where f4: focal length of the fourth lens, and f: focal length of the overall optical system of the imaging lens.

5. The imaging lens according to claim 1, wherein a below conditional expression (9) is satisfied:

$$-0.9 < f1/f4 < -0.2 \tag{9}$$

where f1: focal length of the first lens, and f4: focal length of the fourth lens.

6. The imaging lens according to claim 1, wherein a below conditional expression (11) is satisfied:

$$1.5 < r3/f < 6.3 \tag{11}$$

where r3: paraxial curvature radius of the object-side surface of the second lens, and f: focal length of the overall optical system of the imaging lens.

7. The imaging lens according to claim 1, wherein a below conditional expression (5) is satisfied:

$$0.55 < |r7|/f < 1.95 \tag{5}$$

where r7: paraxial curvature radius of the object-side surface of the fourth lens, and f: focal length of the overall optical system of the imaging lens.

8. The imaging lens according to claim 1, wherein a below conditional expression (12) is satisfied:

$$0.35 < |r9|/f < 1.50 \tag{12}$$

where r9: paraxial curvature radius of the object-side surface of the fifth lens, and f: focal length of the overall optical system of the imaging lens.

9. An imaging lens comprising in order from an object side to an image side, a first lens having positive refractive power and a convex surface facing the object side near the optical axis, a second lens having negative refractive power near the optical axis, a third lens, a fourth lens, a fifth lens having positive refractive power, and a sixth lens having negative refractive power and a concave surface facing the image side near the optical axis, wherein the image-side surface of said sixth lens is formed as an aspheric surface having at least one off-axial pole point, said third lens has the positive refractive power and the concave surface facing the image side near the optical axis, the object-side surface of said sixth lens has the convex surface facing the object side near the optical axis, and below conditional expressions (3), (4) and (5) are satisfied:

$$-2.5 < (D2/f2) \times 100 < -0.7 \tag{3}$$

$$0.03 < T1/T2 < 0.15 \tag{4}$$

$$0.55 < |r7|/f < 1.95 \tag{5}$$

where

D2: thickness along the optical axis of the second lens, f2: focal length of the second lens, T1: distance along the optical axis from the image-side surface of the first lens to the object-side surface of the second lens, T2: distance along the optical axis from the image-side surface of the second lens to the object-side surface of the third lens, r7: paraxial curvature radius of the object-side surface of the fourth lens, and f: focal length of the overall optical system of the imaging lens.

10. The imaging lens according to claim 9, wherein said fifth lens has the biconvex shape having convex surfaces facing the object side and the image side near the optical axis.

11. The imaging lens according to claim 9, wherein a below conditional expression (8) is satisfied:

$$0.3 < f5/f < 1.2 \tag{8}$$

where f5: focal length of the fifth lens, and f: focal length of the overall optical system of the imaging lens.

12. The imaging lens according to claim 9, wherein a below conditional expression (7) is satisfied:

$$-3.7 < f4/f < -0.8 \tag{7}$$

where
f4: focal length of the fourth lens, and
f: focal length of the overall optical system of the imaging lens.

13. The imaging lens according to claim 9, wherein a below conditional expression (9) is satisfied:

$$-0.9 < f1/f4 < -0.2 \tag{9}$$

where
f1: focal length of the first lens, and
f4: focal length of the fourth lens.

14. The imaging lens according to claim 9, wherein a below conditional expression (10) is satisfied:

$$-2.4 < r9/r10 < -0.5 \tag{10}$$

where
r9: paraxial curvature radius of the object-side surface of the fifth lens, and
r10: paraxial curvature radius of the image-side surface of the fifth lens.

15. The imaging lens according to claim 9, wherein a below conditional expression (11) is satisfied:

$$1.5 < r3/f < 6.3 \tag{11}$$

where
r3: paraxial curvature radius of the object-side surface of the second lens, and
f: focal length of the overall optical system of the imaging lens.

16. The imaging lens according to claim 9, wherein a below conditional expression (12) is satisfied:

$$0.35 < |r9|/f < 1.50 \tag{12}$$

where
r9: paraxial curvature radius of the object-side surface of the fifth lens, and
f: focal length of the overall optical system of the imaging lens.

17. An imaging lens comprising in order from an object side to an image side, a first lens having positive refractive power and a convex surface facing the object side near the optical axis,
a second lens having negative refractive power near the optical axis,
a third lens,
a fourth lens,
a fifth lens and
a sixth lens having negative refractive power and a concave surface facing the image side near the optical axis, wherein the image-side surface of said sixth lens is formed as an aspheric surface having at least one off-axial pole point, an aperture stop is arranged between said second lens and said third lens, the object-side surface of third lens has the convex surface facing the object side near the optical axis, the image-side surface of said fourth lens has the concave surface facing the image side near the optical axis, and said fifth lens has a biconvex shape having the convex surfaces facing the object side and the image side near the optical axis, and
a below conditional expression (10) is satisfied:

$$-2.4 < r9/r10 < -0.5 \tag{10}$$

where
r9: paraxial curvature radius of the object-side surface of the fifth lens, and
r10: paraxial curvature radius of the image-side surface of the fifth lens.

18. The imaging lens according to claim 17, wherein a below conditional expression (4) is satisfied:

$$0.03 < T1/T2 < 0.15 \tag{4}$$

where
T1: distance along the optical axis from the image-side surface of the first lens to the object-side surface of the second lens, and
T2: distance along the optical axis from the image-side surface of the second lens to the object-side surface of the third lens.

* * * * *